(12) United States Patent
Liu et al.

(10) Patent No.: US 9,009,054 B2
(45) Date of Patent: Apr. 14, 2015

(54) PROGRAM ENDPOINT TIME DETECTION APPARATUS AND METHOD, AND PROGRAM INFORMATION RETRIEVAL SYSTEM

(75) Inventors: Kun Liu, Beijing (CN); Weiguo Wu, Beijing (CN); Li Lu, Beijing (CN); Qingwei Zhao, Beijing (CN); Yonghong Yan, Beijing (CN); Hongbin Suo, Beijing (CN)

(73) Assignees: Sony Corporation, Tokyo (JP); Institute of Acoustics, Chinese Academy of Sciences, Beijing (CN)

( * ) Notice: Subject to any disclaimer, the term of this patent is extended or adjusted under 35 U.S.C. 154(b) by 1043 days.

(21) Appl. No.: 12/914,346

(22) Filed: Oct. 28, 2010

(65) Prior Publication Data
US 2011/0106531 A1    May 5, 2011

(30) Foreign Application Priority Data
Oct. 30, 2009    (CN) .......................... 2009 1 0208950

(51) Int. Cl.
*G10L 21/00*    (2013.01)
*G10L 11/06*    (2006.01)
*G06F 17/30*    (2006.01)

(52) U.S. Cl.
CPC .... G06F 17/30743 (2013.01); G06F 17/30749 (2013.01)

(58) Field of Classification Search
CPC ......... G10L 25/93; G10L 25/78; G10L 19/18; G10L 19/12; G10L 25/87; G10L 15/04; H05K 999/99
USPC ................... 704/248, 253, 200–218, 270–278
See application file for complete search history.

(56) References Cited

U.S. PATENT DOCUMENTS 4,750,052 A * 6/1988 Poppy et al. .................. 386/278
6,324,509 B1 * 11/2001 Bi et al. ........................ 704/248

(Continued)

FOREIGN PATENT DOCUMENTS

| CN | 101021854 | 8/2007 |
| CN | 101102240 | 1/2008 |

(Continued)

OTHER PUBLICATIONS

Lu et al. "Content Analysis for Audio Classification and Segmentation", 2002.*

(Continued)

*Primary Examiner* — Samuel G Neway
(74) *Attorney, Agent, or Firm* — Oblon, McClelland, Maier & Neustadt, L.L.P.

(57) ABSTRACT

This invention relates to retrieval for multimedia content, and provides a program endpoint time detection apparatus for detecting an endpoint time of a program by performing processing on audio signals of said program, comprising an audio classification unit for classifying said audio signals into a speech signal portion and a non-speech signal portion; a keyword retrieval unit for retrieving, as a candidate endpoint keyword, an endpoint keyword indicating start or end of the program from said speech signal portion; a content analysis unit for performing content analysis on context of the candidate endpoint keyword retrieved by the keyword retrieval unit to determine whether the candidate endpoint keyword is a valid endpoint keyword; and a program endpoint time determination unit for performing statistics analysis based on the retrieval result of said keyword retrieval unit and the determination result of said content analysis unit, and determining the endpoint time of the program. In addition, this invention also provides a program information retrieval system. With present invention, program information regarding a program attended by user can be rapidly obtained.

25 Claims, 6 Drawing Sheets

(56) References Cited

U.S. PATENT DOCUMENTS

| | | | | |
|---|---|---|---|---|
| 6,600,874 | B1* | 7/2003 | Fujita et al. | 386/249 |
| 6,718,302 | B1* | 4/2004 | Wu et al. | 704/233 |
| 6,901,362 | B1* | 5/2005 | Jiang et al. | 704/214 |
| 6,973,256 | B1* | 12/2005 | Dagtas | 386/241 |
| 7,161,887 | B2* | 1/2007 | Snow et al. | 369/53.32 |
| 7,302,160 | B1* | 11/2007 | Wells | 386/250 |
| 7,324,939 | B1* | 1/2008 | Cardillo et al. | 704/236 |
| 7,962,330 | B2* | 6/2011 | Goronzy et al. | 704/201 |
| 8,010,363 | B2* | 8/2011 | Koga et al. | 704/270 |
| 8,028,234 | B2* | 9/2011 | Li | 715/719 |
| 2005/0195331 | A1 | 9/2005 | Sugano et al. | |
| 2007/0179786 | A1* | 8/2007 | Masaki et al. | 704/270 |
| 2007/0248327 | A1* | 10/2007 | Chen | 386/96 |
| 2008/0127244 | A1* | 5/2008 | Zhang | 725/32 |
| 2008/0193016 | A1* | 8/2008 | Lim et al. | 382/190 |
| 2008/0276266 | A1* | 11/2008 | Huchital et al. | 725/32 |
| 2008/0281586 | A1* | 11/2008 | Florencio et al. | 704/214 |
| 2008/0292279 | A1* | 11/2008 | Kamada et al. | 386/124 |
| 2008/0300872 | A1* | 12/2008 | Basu et al. | 704/235 |
| 2009/0006102 | A1* | 1/2009 | Kan et al. | 704/500 |
| 2009/0222442 | A1* | 9/2009 | Houh et al. | 707/5 |
| 2010/0004926 | A1* | 1/2010 | Neoran et al. | 704/201 |
| 2010/0042412 | A1* | 2/2010 | Aronowitz et al. | 704/270 |
| 2010/0121936 | A1* | 5/2010 | Liu et al. | 709/217 |
| 2011/0106531 | A1* | 5/2011 | Liu et al. | 704/214 |

FOREIGN PATENT DOCUMENTS

| | | |
|---|---|---|
| CN | 101281534 | 10/2008 |
| CN | 101364222 | 2/2009 |
| CN | 101472082 | 7/2009 |

OTHER PUBLICATIONS

Lu et al. "Content-based Audio Classifcation and Segmentation by Using Support Vector Machines", 2003.*
Liu et al. "Audio Feature Extraction and Analysis for Scene Segmentation and Classification", 1998.*
Zhang et al. "Hierarchical System for Content-based Audio Classification and Retrieval", 1998.*
Xu et al. "Creating Audio Keywords for Event Detection in Soccer Video", 2003.*
Guo et al. "Content-Based Audio Classification and Retrieval by Support Vector Machines", 2003.*
Dong et al. "Semantic Segmentation of Documentary Video Using Music Breaks", 2006.*
Radhakrishan et al. "Generation of Sports Highlights Using a Combination of Supervised and Unsupervised Learning in Audio Domain", 2003.*
Hanjalic et al. "Semi-automatic News Analysis, Indexing and Classification System Based on Topics Preselection", 1999.*
Lu et al. "Audio Keywords Discovery for Text-like Audio Content Analysis and Retrieval", Jan. 2008.*
Lu et al. "Speaker Change Detection and Tracking in Real-time News Broadcasting Analysis", 2002.*
Audio Feature Extraction and Analysis for Scene Segmentation and Classification, Liu, Z., et al, Journal of VLSI Signal Processing, (39 pages) (1998).
A Decision Tree-based Multimodal Data Mining Framework for Soccer Goal Detection, Shu-Ching Chen, Mei-Ling Shyu, Min Chen, Chengcui Zhang, 2004 IEEE International Conference on Multimedia and Expo, vol. 1, Jun. 2004, pp. 265-268 (4 pages).

* cited by examiner

PROGRAM ENDPOINT TIME DETECTION APPARATUS AND METHOD, AND PROGRAM INFORMATION RETRIEVAL SYSTEM

TECHNICAL FIELD

This invention relates to a multimedia content detection, more particularly a program endpoint time detection apparatus and method as well as a program information retrieval system which can perform detection on the endpoint time of the program by employing a method for audio signal process.

BACKGROUND

Generally, sports video game duration is relatively long, and the contents really attended by vast sports fans often only occupies a small part of the contents of entire game. With impact of increasing sports videos, people's demand on the effective retrieval and management with respect to the sports videos is more pressing. For most of time, people do not have enough time to watch a live show. Thus, many fans will record the sports program, and then take it out for watch when he/she is free. When watching it, the user can selectively watch some important plays therein such as the second half, the deciding set or the like. Therefore, in this case, the ability to accurately obtain start time information of the game is very important.

On the other hand, if the user needs to find a content of his/her concern, he/she often has to traverse from start to end so as to find the content in need, which is time-consuming and laborious. Therefore, if there is such a sports content retrieval system that can help user search some contents of real concern, the time can be greatly saved.

With respect to the above topics, those skilled in the art have carried out the following studies.

In the non-patent reference 1, only speech information is used to perform recognition on five types of TV programs, namely ads, basketball game, football match, news report and weather forecast, a neural network classifier is used, and finally, image analysis is taken into conjunction to improve precision without performing analysis and retrieval on the contents of television program.

In the non-patent reference 2, video feature is taken into conjunction so as to use a decision tree for football goal detection in the sports game. However, retrieval is only performed on the goal in one type of sports game, and the detection framework only applies to a football match and does not apply to the other matches.

In the patent reference 1, audio and video features are utilized at the same time to perform a scene classification on the sports game, including five types of scenes of field panoramic, close-up, corner kick, free kick and goal, wherein the audio features are mainly used to recognize two categories of applauses and whistles.

In the patent reference 2, only speech recognition technology is used to obtain text content, and a match with content to be searched for is performed in the text contents obtained after recognition, thus the content needed to be retrieved is obtained.

In the patent reference 3, at first stage, semantic tags are used to perform an associated audio search on the multimedia data with a manual annotation, and at second stage, this type of music feature is trained on line on the basis of audio query result of the semantic tags, and is use for the query of the audio contents.

In the patent reference 4, a collection method and retrieval method for audio and video contents is proposed, in which in terms of audio, by recognizing a sound after segment and generating a corresponding relation table between sound and word, the user employs a sound clip in need to retrieve the word being used from the corresponding relation table.

As can be seen from above studies, for current existing studies, analysis and detection are only performed on a specific content in one or two sports games content, and these studies are strongly directed and can not be well extended to the content retrieval for other types of sports games. However, with an increasing variety of sports games, it becomes less possible for the consumers to have enough time to watch whole game from start to end. Therefore, how to provide an automated content retrieval system for sports game to help user quickly and easily retrieve the contents of his/her own concern is a problem pressingly attended by vast sports fans at present.

Non-patent reference 1: Liu, Z., et al., "Audio feature extraction and analysis for scene segmentation and classification", Journal of VLSI Signal Processing, pp. 61 to 70 (1998).

Non-patent reference 2: Shu-Ching Chen, Mei-ling Shyu, Min Chen, Chengcui Zhang, "A decision tree-based multimodal data mining framework for soccer goal detection", 2004 IEEE International Conference on Multimedia and Expo, Volume 1, June 2004, pp. 265-268.

Patent reference 1: US 2005/0195331 A1
Patent reference 2: CN101281534
Patent reference 3: CN101364222
Patent reference 4: CN101102240

SUMMARY OF THE INVENTION

In order to realize above objects, the present invention provides a program endpoint time detection apparatus for detecting an endpoint time of a program by performing processing on audio signals of said program, which comprises an audio classification unit for classifying said audio signals into a speech signal portion and a non-speech signal portion; a keyword retrieval unit for retrieving, as a candidate endpoint keyword, an endpoint keyword indicating start or end of the program from said speech signal portion; a content analysis unit for performing content analysis on context of the candidate endpoint keyword retrieved by the keyword retrieval unit to determine whether the candidate endpoint keyword is a valid endpoint keyword; and a program endpoint time determination unit for performing statistics analysis based on the retrieval result of said keyword retrieval unit and the determination result of said content analysis unit, and determining the endpoint time of the program.

The present invention further provides a program endpoint time detection method for detecting an endpoint time of a program by performing processing on audio signals of said program, which comprises an audio classification step of classifying said audio signals into a speech signal portion and a non-speech signal portion; a keyword retrieval step of retrieving, as a candidate endpoint keyword, an endpoint keyword indicating start or end of the program from said speech signal portion; a content analysis step of performing content analysis on the context of the candidate endpoint keyword retrieved by the keyword retrieval step, so as to determine whether the candidate endpoint keyword is a valid endpoint keyword; and a program endpoint time determination step of performing statistics analysis based on the retrieval result of said keyword retrieval step and the determination result of said content analysis step, and determining the endpoint time of the program.

In addition, the present invention also provides a program information retrieval system for obtaining program information desired by the user by performing processing on audio signals of a program, which comprises a display apparatus for displaying a user interface of said system; a program import apparatus for importing a plurality of programs into said program information retrieval system and displaying a program list on said display apparatus; and a program endpoint time detection apparatus for analyzing a program selected by the user from said program list, so as to obtain the endpoint time of said program and display the endpoint time of said program on said display apparatus; wherein said program endpoint time detection apparatus comprises an audio classification unit for classifying said audio signals into a speech signal portion and a non-speech signal portion; a keyword retrieval unit for retrieving, as a candidate endpoint keyword, an endpoint keyword indicating start or end of the program from said speech signal portion; a content analysis unit for performing content analysis on context of the candidate endpoint keyword retrieved by the keyword retrieval unit to determine whether the candidate endpoint keyword is a valid endpoint keyword; and a program endpoint time determination unit for performing statistics analysis based on the retrieval result of said keyword retrieval unit and the determination result of said content analysis unit, and determining the endpoint time of the program.

With the program endpoint time detection apparatus and method according to the present invention, the user can rapidly and easily find precise start and end time point of a program from a lengthy program video.

In addition, with the program information retrieval system according to the present invention, it is possible to comprehend and analyze a program content, and help user extract some interested event and information, such as retrievals for category of program, highlight event, critical name and team name, start and end time points of different programs or the like.

DETAILED DESCRIPTION OF THE PREFERRED EMBODIMENTS

Hereinafter, the detailed embodiments of present invention will be explained based on the appended drawings.

The word "program" mentioned in present invention includes all the multimedia contents containing audio, video or the like that audience wants to watch/listen to, such as sports game, cultural performance, TV play, drama, TV interview, concert, home video or the like. In addition, "endpoint" of a program refers to start point and end point of a portion in the program that is of the audience' real concern, such as start point and end point of the first and second half of the football match. The following description will be explained mainly by taking sports game program as an example. However, present invention is not limited to the retrieval for the sports game program, and can be applied to the retrieval for any program, including those listed above and those other than being listed.

Figure 1:
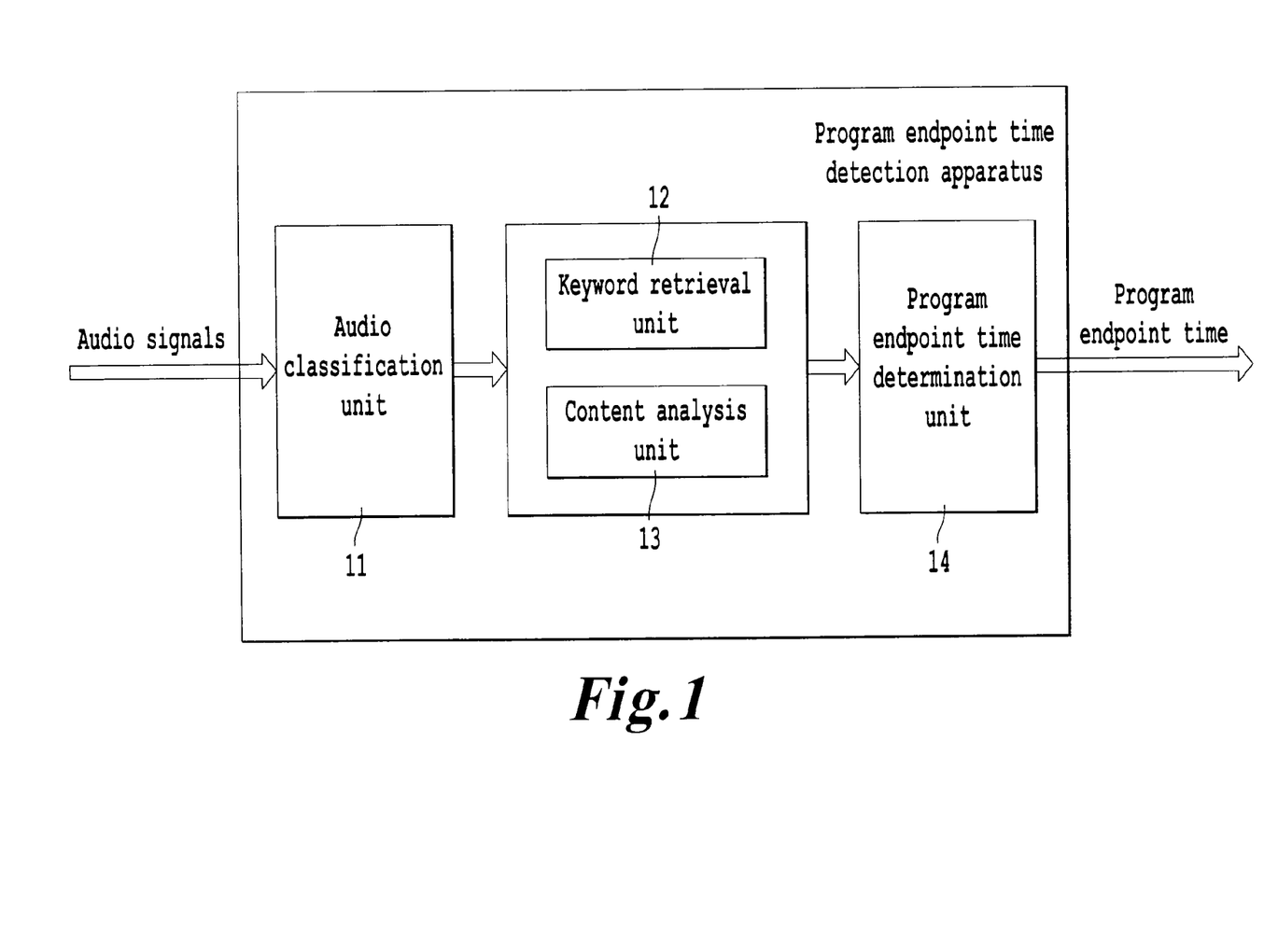
FIG. 1 is a block diagram illustrating a program endpoint time detection apparatus 1 according to first embodiment of present invention.

FIG. 1 is a block diagram illustrating a program endpoint time detection apparatus 1 according to first embodiment of present invention.

As shown in the FIG. 1, the program endpoint time detection apparatus 1 comprises an audio classification unit 11 for classifying audio signals into a speech signal portion and a non-speech signal portion; a keyword retrieval unit 12 for retrieving, as a candidate endpoint keyword, endpoint keyword indicating start or end of the program from the speech signal portion; a content analysis unit 13 for performing content analysis on context of the candidate endpoint keyword retrieved by the keyword retrieval unit 12 to determine whether the candidate endpoint keyword is a valid endpoint keyword; and a program endpoint time determination unit 14 for performing statistics analysis based on the retrieval result of said keyword retrieval unit 12 and the determination result of said content analysis unit 13, and determining the endpoint time of the program. As is obvious to those skilled in the art, each of the above units can be implemented by individual separate apparatus, or can be partly or wholly integrated into a same integrated circuit, or can be implemented by well-known computer.

The audio classification unit 11 takes in an audio signal through an interface (not shown), and separate the speech signal portion of the audio signal from the non-speech signal portion. As a separation method thereof, a plurality of methods can be used, such as a model based classification method, a cluster based method, or a combination thereof based method. Taking the combination thereof based method as an example, when 10 types of games are exemplified as shown in the table 1, result of speech segmentation is as follows:

TABLE 1

| Sports | Precision | Recall | F value |
| --- | --- | --- | --- |
| Basketball | 88.03% | 91.40% | 89.69% |
| Tennis | 92.05% | 94.20% | 93.11% |
| Football | 89.84% | 94.42% | 92.07% |
| Volleyball | 85.39% | 94.37% | 89.65% |
| Golf | 69.25% | 94.87% | 80.06% |
| Badminton | 92.34% | 87.37% | 89.79% |
| Table Tennis | 93.25% | 91.87% | 92.56% |
| Hockey | 96.31% | 86.89% | 91.36% |
| Beach Volleyball | 92.71% | 89.74% | 91.20% |
| Billiards | 90.29% | 91.95% | 91.11% |
| Average | 88.90% | 91.70% | 90.28% | wherein,

Precision (speech)=duration of correct extracted speech/duration of total speech in result Recall (speech)=duration of correct extracted speech/duration of total speech in reference $F$ value=2×precision×recall/(precision+recall)

As an example, the keyword retrieval unit 12 firstly inputs the speech signal portion obtained through segment by the audio classification unit 11 to the recognition system, constructs the obtained recognition result into a retrieval document, then searches this retrieval document for desired keyword (namely, keyword match), and finally obtains keyword result. The above keyword can be pre-stored in the memory (not shown) and invoked by the keyword retrieval unit 12 to perform the keyword retrieval as descried above. The keyword to be selected herein refers to an expression associated with the start/end of a game (match), that is, endpoint keyword such as "this match is started", "start", "kick-off", "begin", "end", "terminate" or the like. In the memory not shown, in addition to the above endpoint keywords, other keywords and other contents for other retrieval purposes also can be stored, which will be further described hereinafter. In addition, since an expression similar to the meaning of "this match is started" also may be present in the match, other information is needed to assist in obtaining the finial result so as to acquire a valid endpoint keyword, and this will be described later. Keyword search performance regarding 105 games of 10 types of sports games are shown in the table 2.

TABLE 2

| Sports | the number of keywords that appear | correct rate of keyword detection |
|---|---|---|
| Badminton | 89 | 64.25 |
| Table Tennis | 70 | 67.62 |
| Golf | 131 | 78.19 |
| Volleyball | 140 | 71.46 |
| Tennis | 264 | 73.28 |
| Basketball | 149 | 58.72 |
| Football | 176 | 69.65 |
| Beach Volleyball | 94 | 65.42 |
| Hockey | 155 | 62.68 |
| Billiards | 385 | 65.04 |
| Average | 165 | 67.63 |

In addition, as a keyword retrieval technology, it is not limited to the method of present embodiment in which keyword retrieval is performed with retrieval document match. On top of this, there also exists so-called Garbage model based retrieval method, which is a keyword retrieval technology of directly performing a model match from the audio. Since false alarm is relatively high for this method, and performance of the latter one is more stable as compared with text match based keyword retrieval method adopted by present invention, in present invention, the text match based method is used to perform keyword retrieval. Of course, those skilled in the art can properly select a keyword retrieval method according to the requirement.

The content analysis unit 13 performs analysis on the context sentence before and/or after the keyword retrieved by the keyword retrieval unit 12. Here, as an example, analysis is performed on the commentaries to sports game, so as to judge whether or not the games started. For example, the narrator said: "now, this match started 10 minutes before", or "this match is about to come to an end", and at this time, since this sentence contains a keyword like "start", "end", it will be retrieved by the keyword search unit 12 as a candidate endpoint keyword. However, at this time, because actually 10 minutes has elapsed since the start of this match, or this match is not ended yet, at this moment the content analysis unit 13 will analyze the context of keyword of "start" and "end" herein, thus it can be judged that the keyword of "start" herein is essentially a false alarm and can be excluded.

In addition, since many phrases can be used to describe the expression of "the match is started/ended" and sometimes the narrator does not explicitly speak a phrase like "the match is started/ended", in this case, the content analysis unit 13 can further retrieve an expression similar to the expression or the phase of "the match is started/ended", so as to determine whether or not the match is started/ended.

As a method used by the content analysis unit 13, Natural Language Understanding technology can be utilized to accomplish above operations. Of course, as is obvious to those skilled in the art, in addition to Natural Language Understanding technology, any other method capable of realizing above object also can be used.

The program endpoint time determination unit 14 performs a statistics analysis on the information available hereinbefore, so as to finally judge the program, that is, start time information on game play. Many methods can be used by the program endpoint time determination unit 14 to perform statistics analysis. Here, as an example, information fusion technology is adopted in present invention.

The information fusion system structure has a variety of forms, levels and hierarchies. Classified in accordance with fusion hierarchy, common information fusion system structures can be divided into three categories, namely, data layer fusion, feature layer fusion, decision-making layer fusion. Data level fusion is a fusion of lowest hierarchy, in which a fusion processing is directly performed on the observed data of multi-sensors, and then feature extraction and decision-making judgment are performed based on the result of fusion. When data layer fusion is used to monitor, information loss is small, but amount of data transfer is large, data format is not unified and hard to be processed. Feature level fusion is a fusion of middle hierarchy, in which processing is firstly performed on the detection data of each sensors, respective feature vectors are obtained, and then fusion is performed on respective feature vectors. For the feature level fusion, data format is unified and easy to be processed, and the amount of data transfer is relatively small, but part of information will be lost. Decision-making level fusion is a fusion of high hierarchy, in which a decision-making is provided by each sensors based on detection data, then fusion processing is performed on respective decisions, thus the final result of decision-making is obtained. For the decision-making level fusion, the amount of data transfer is small, the ability of anti-interference is strong, data format is unified and easy to be processed, but information loss is most serious. In short, each of the fusion structures has advantages and disadvantages, and which structure should be specifically selected to accomplish information fusion depends on the requirements of specific issues. The fusion system structure commonly used at present is the feature level fusion, since it has the advantage of small information loss accompanied with data level fusion as well as the advantage of data being easily transferred and processed accompanied with the decision layer fusion.

Information fusion algorithm mainly originates from the reference and improvement to the existing information processing methods, and the theory involved could be concluded as follows:

a) estimation theory method, such as the Kalman filter, wavelet transform, Gauss and filtering or the like.
b) probability theory based method, such as classical probabilistic reasoning, classical Bayes reasoning, Bayes convex set theory and information theory or the like.
c) non-probabilistic method, such as DS evidence reasoning, conditional event algebra, random set theory, rough set, wavelet transformation or the like.
d) intelligent method, such as fuzzy logic, artificial neural networks, support vector machines, evolutionary algorithm or the like.

In the specific application, which types of information fusion system should be selected and constructed as well as which kind of fusion algorithm should be adopted depends on the requirement of application object.

Figure 2:
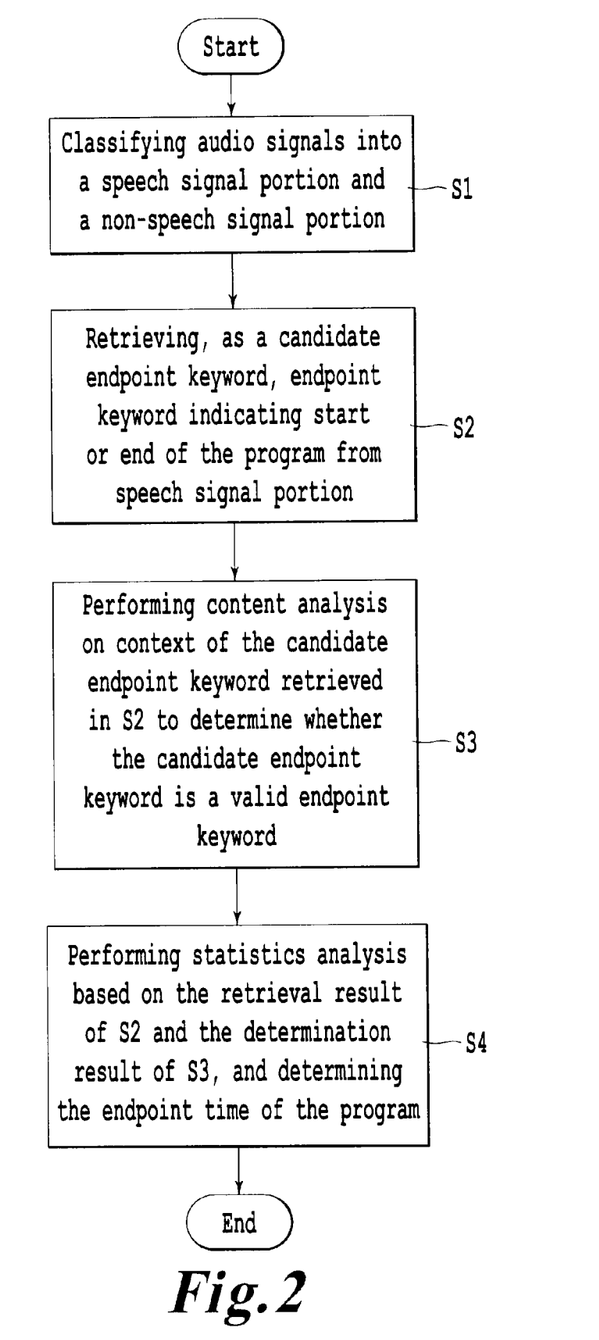
FIG. 2 is a flowchart illustrating a program endpoint time detection method according to the first embodiment of present invention.

FIG. 2 is a flowchart illustrating a program endpoint time detection method according to the first embodiment of present invention.

In step S1, the audio classification unit 11 classifies the audio signals into a speech signal portion and a non-speech signal portion. In step S2, the keyword retrieval unit 12 retrieves, as a candidate endpoint keyword, endpoint keyword indicating start or end of the program from the speech signal portion. In step S3, the content analysis unit 13 performs content analysis on context of the candidate endpoint keyword retrieved by the keyword retrieval unit 12 to determine whether the candidate endpoint keyword is a valid endpoint keyword. In step S4, the program endpoint time determination unit 14 performs statistics analysis based on the retrieval result of the keyword retrieval unit 12 and the determination result of the content analysis unit 13, and determining the endpoint time of the program.

Figure 3:
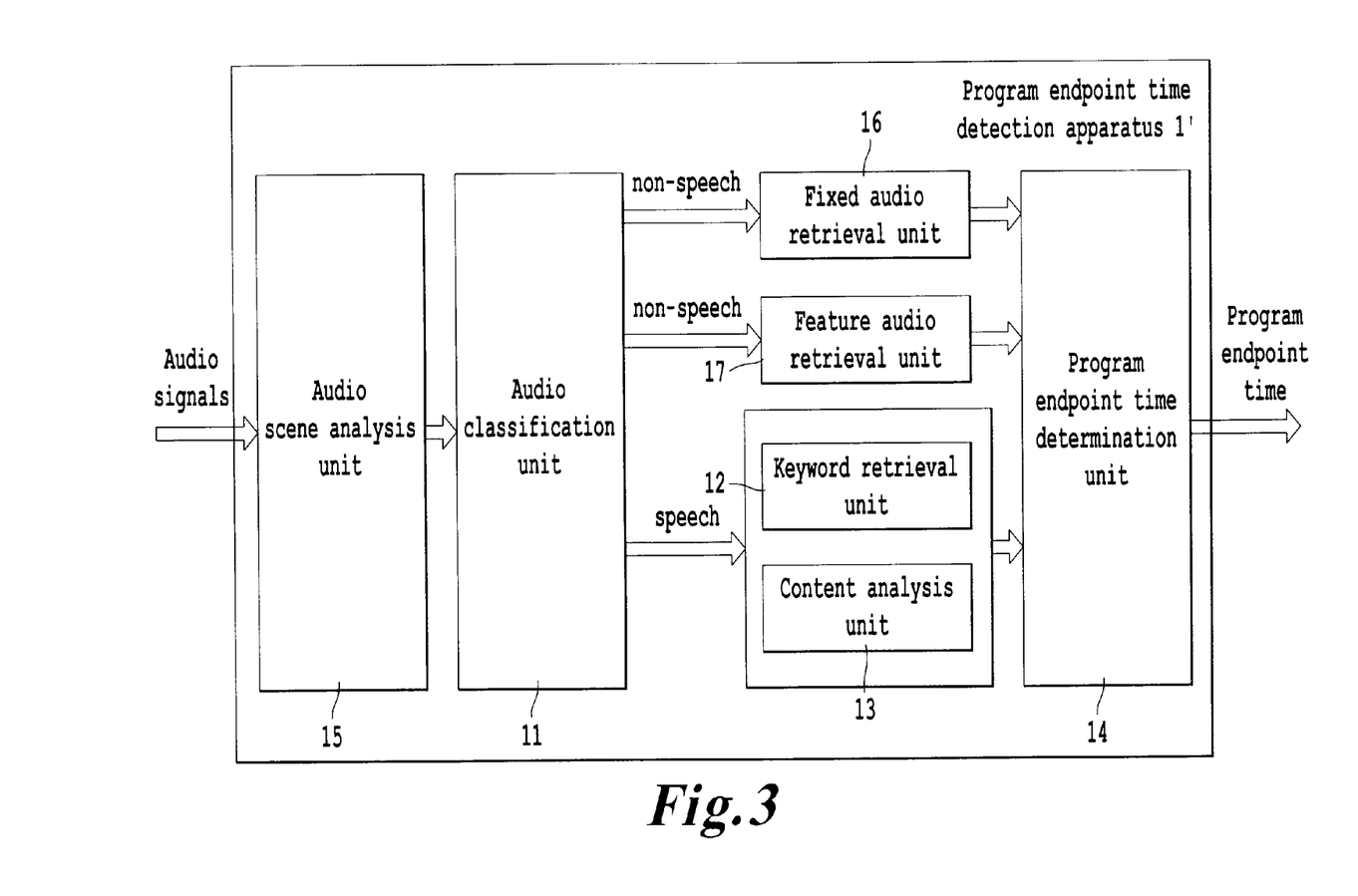
FIG. 3 is a flowchart illustrating a program endpoint time detection apparatus 1' according to a second embodiment of present invention.

FIG. 3 is a flowchart illustrating a program endpoint time detection apparatus 1' according to a second embodiment of present invention.

For the units with a same function as those in the FIG. 1, repeated explanation will be omitted, and only the difference will be explained.

In addition to the audio classification unit 11, the keyword retrieval unit 12, the content analysis unit 13 and the program endpoint time determination unit 14 shown in the FIG. 1, the program endpoint time detection apparatus 1' shown in the FIG. 3 includes an audio scene analysis unit 15 for dividing the input audio signals into a plurality of portions containing a program-on-the-spot audio portion; a fixed audio retrieval unit 16 for retrieving a fixed audio portion from the non-speech signal portion; and a feature audio retrieval unit 17 for retrieving, from the non-speech signal portion divided by the audio classification unit 11, a feature audio portion indicating start or end of the program; wherein the program endpoint time determination unit 14 determines the endpoint time of the program based on the processing results of respective units described above.

The audio scene analysis unit 15 can divide all the input audio signals into the portions of studio audio, program-on-the-spot audio (game-on-the-spot audio), adv music and silence or the like. There exists a plurality of division method for the audio scenes. As an example, the following one is used in present invention. For example, the program endpoint time detection apparatus 1' also can include a switching gap detection unit (not shown) for discriminating a switching gap (namely, silence portion) between different programs. With switching gap (namely, silence portion) between different programs detected by the switching gap detection unit, the audio is divided into a plurality of portions, and then, with a method such as model based method or the like, the divided plurality of portions are respectively classified into the portions of studio audio, program-on-the-spot audio (game-on-the-spot audio), adv music and silence or the like. Additionally, in the above several portions, the audio classification unit 11 only classifies the program-on-the-spot audio (game-on-the-spot audio) portion of the audio signals into a speech signal portion and a non-speech signal portion. With a pre-division performed on audio signal by the audio scene analysis unit 15, it is possible to improve classification efficiency of the audio classification unit 11, thus making a contribution to the retrieval of the program endpoint time.

The fixed audio retrieval unit 16 is used to retrieve a fixed audio portion from the non-speech signal portion divided by the audio classification unit 11. Here, the expression of "fixed audio portion" refers to an audio portion before a certain program starts. In the sports games, for example, certain music will be fixedly played before the start of NBA game. For another example, national anthem of participating countries will be played before the start of a certain football match. All of these fixed audio indicate that the game/match is about to start. This kind of fixed audio is usually located in non-speech portion. By capturing the fixed audio, the approximate start time of game can be determined, thus it is possible to narrow the retrieval range and make a contribution to the determination of the valid program endpoint time. There exists a plurality of retrieval methods such as template based retrieval method, biomimetic pattern recognition based method or the like, and depending on specific needs, a flexible selection can be made. In addition, although not shown in the figures, sometimes above fixed audio may be included in the portions of above adv music or the like. Therefore, the fixed audio retrieval unit 16 also can retrieve from the plurality of portions divided by the audio scene analysis unit 15 as described above.

The feature audio retrieval unit 17 is used to retrieve a feature audio portion indicating start or end of the program from the non-speech signal portion divided by the audio classification unit 11. The "feature audio portion" herein refers to a sound specific to sports game, such as music, whistle and stroke or the like. Since these sounds appear only in the games, appearance or disappearance of the specific sound accompanied with continuance of the game indicates the start or end of the game. By retrieving this feature audio, the start and end time of the game also can be approximately determined, thus it is possible to narrow the retrieval range and make a contribution to the determination of the effective program endpoint time. There exists a plurality of retrieval methods such as model-based method, detection method using GMM/HMM training model, detection method using svm, or fusion method of above several types, and a flexible selection may be made according to a specific need. In addition, since sometimes these audio features spread all over the audio portion of the entire game-on-the-spot, it is preferred to retrieve the above feature audio portion only from a specific portion which is adjacent to the two ends of audio portion of game-on-the-spot, so as to approximately determine the start or end time of the game. In this manner, the retrieval efficiency can be greatly improved.

With the fixed audio retrieved by the fixed audio retrieval unit 16, or the feature audio retrieved by the feature audio retrieval unit 17, or a combination thereof, time range of valid game can be further narrowed, thus within the narrowed time range being determined, the keyword retrieval unit 12 can perform retrieval on the audio signal therein, especially on the audio signal in a specific range adjacent to the two ends thereof. Thus, it is possible to further improve the retrieval efficiency and make a contribution to the determination of valid program endpoint time.

In this embodiment, the program endpoint time determination unit 14 can perform comprehensive statistics analysis according to, in addition to the information obtained by keyword retrieval and content analysis, the retrieval results of the fixed audio retrieval unit 16 and the feature audio retrieval unit 17 etc, thus it is possible to further improve the determination precision of the valid endpoint keyword as compared with that of the first embodiment. Hence the retrieval efficiency of the program endpoint time is improved. The method used by the statistics is the same as that of the first embodiment.

As described above, in the program endpoint time detection apparatus 1' of the second embodiment, by adding the audio scene analysis unit 15, the fixed audio retrieval unit 16 and the feature audio retrieval unit 17 to the program endpoint time detection apparatus 1 of the first embodiment, it is possible to more quickly and precisely perform the endpoint detection of the program as compared with the program endpoint time detection apparatus 1 of the first embodiment. However, according to the difference in the effect and performance desired, the modified embodiment of the above embodiment, which is obtained by adding to the first embodiment any one of the audio scene analysis unit 15, the fixed audio retrieval unit 16 or the feature audio retrieval unit 17, or any combination thereof, also falls into the scope claimed by present invention.

Figure 4:
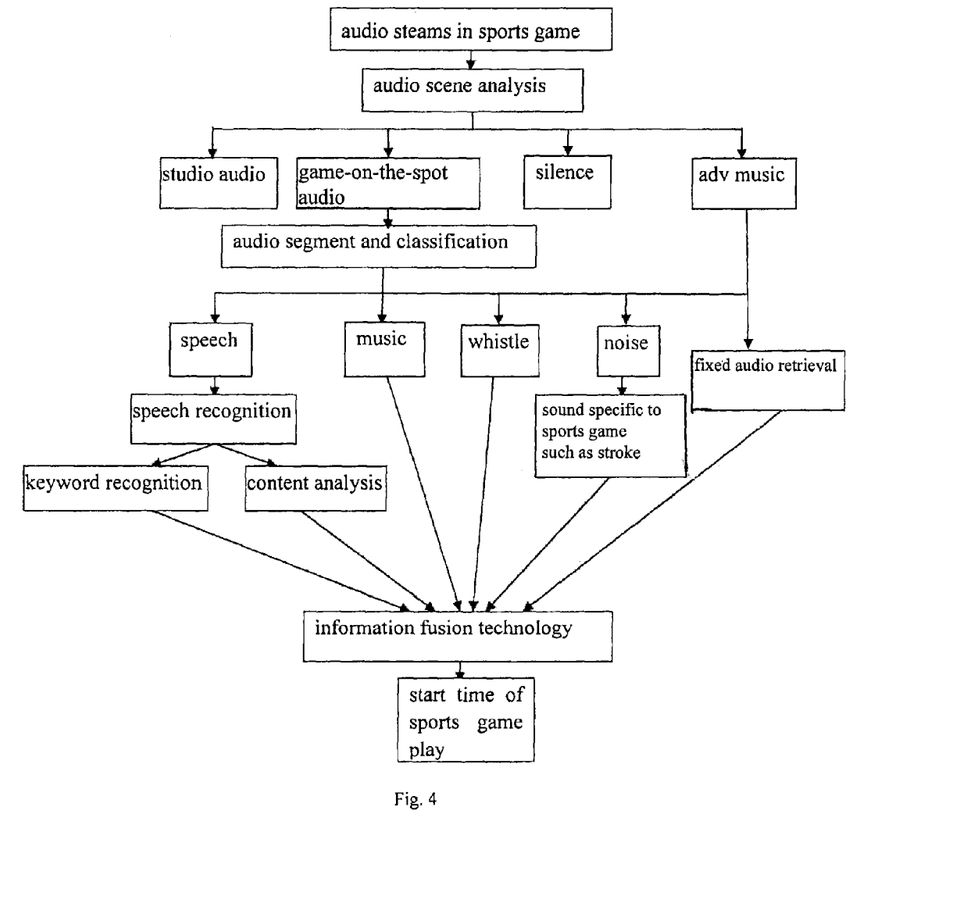
FIG. 4 is a module concept diagram illustrating the program endpoint time detection apparatus 1' according to the second embodiment of present invention.

FIG. 4 is a module concept diagram illustrating the program endpoint time detection apparatus 1' according to the second embodiment of present invention.

First, the input audio stream about sports games is divided by the audio scene analysis module into a plurality of portions including the portion of studio audio, game-on-the-spot audio, silence and adv music or the like. In these portions, game-on-the-spot audio portion is further divided by an audio segment and classification module into speech and non-speech (including music, whistle, noise in which sometimes a sound specific to sports games such as shots or the like is included) portions. Speech portion is processed by a speech recognition module including a keyword recognition module and a content analysis module. Information fusion technology module comprehensively analyzes the keyword recognition result, content analysis result, non-speech retrieval result and fixed audio retrieval result or the like, thus the start time of sports game play is obtained.

Figure 5:
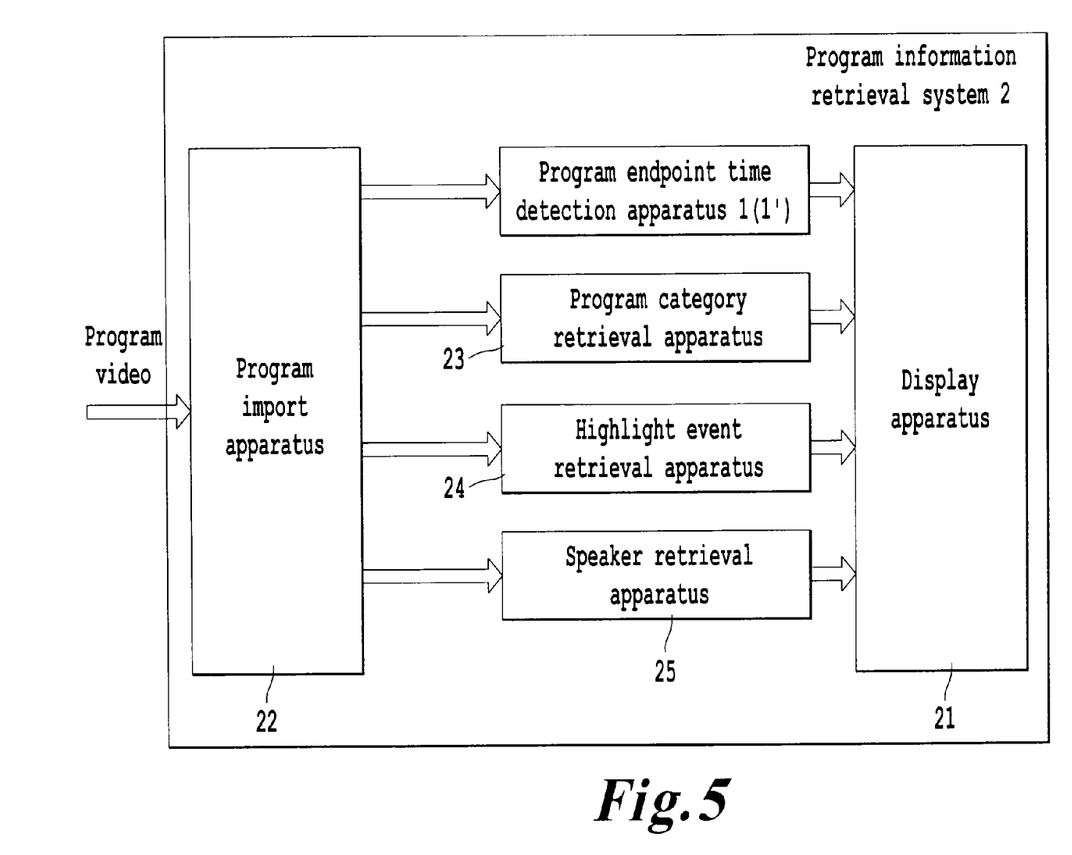
FIG. 5 is a block diagram illustrating a program information retrieval system 2 to which the program endpoint time detection apparatus 1(1') of present invention is applied.

FIG. 5 is a block diagram illustrating a program information retrieval system 2 to which the program endpoint time detection apparatus 1(1') of present invention is applied.

Hereinafter, the program information retrieval system 2 to which the program endpoint time detection apparatus 1(1') of present invention is applied will be explained with reference to the FIG. 5. By processing the audio signal of the program, the program information retrieval system 2 obtains the program information desired by the user; wherein, the program information retrieval system 2 at least includes a display apparatus 21 for displaying a user interface of the system; a program import apparatus 22 for importing a plurality of programs into the program information retrieval system 2 and displaying a program list on the display apparatus 21; and the program endpoint time detection apparatus 1 (1') (already explained in the above embodiment). With respect to the program endpoint time detection apparatus 1 (1'), the explanation has been made hereinbefore, and the repeated description will be omitted. Further, the program information retrieval system 2 can also include a program category retrieval apparatus 23 for classifying a plurality of programs imported by the program import apparatus 22 in accordance with a category to which the program belongs, and displaying, according to a category instructed by the user, a program list of this category on the display apparatus 21; a highlight event retrieval apparatus 24 for retrieving a cheering clip occurred in the program, and displaying a time information thereof on the display apparatus 21; a speaker retrieval apparatus 25 for retrieving a portion in the program in which a specific speaker is speaking, and differently displaying, on the display apparatus 21, the time information about the speaking portion by different speakers; wherein the keyword retrieval unit 12 further displays a keyword list corresponding to the program selected by the user from the program list on the display apparatus 21 and retrieves corresponding keyword according to the selection of the user, and displays the time information about the keyword on the display apparatus 21.

In order to facilitate user's operation, the program information retrieval system 2 has a display apparatus 21, and on the display apparatus 21, the user interface of this system is displayed for operation by the user. The display apparatus may be a variety of display apparatus, such as CRT display, liquid crystal display, plasma display and touch panel or the like.

The program import apparatus 22 imports a plurality of programs stored in a specific region in the memory (not shown) which is disposed in the program information retrieval system 2, into the program information retrieval system 2, and displays a program list on the display apparatus 21. Thus, the user can select the desired program from the program list, and retrieval analysis is performed thereon by the program information retrieval system 2.

In addition, it is also possible to include the program category retrieval apparatus 23 for classifying the program, thus instead of various types of programs mixed together, respective categories of programs can be displayed on the display apparatus 21. For example, classification method thereof can be carried out with the keyword retrieval of the keyword retrieval unit 12, and details are explained as follows. If a keyword specific to a certain game is selected to perform retrieval, and the resultant keywords are arranged according to descending confidence, the number of N keywords with highest confidence can be obtained in this way. If a value obtained by a combination of the keyword of a certain game and the confidence thereof is maximum, this category is category of this game. In the 105 games (10 types of game categories), the result of game category judgment demonstrates that recognition rate is 100%. Here, the specific keyword also can be stored in a specific region in the memory (not shown).

In addition, the program category retrieval apparatus 23 also can be used for the program endpoint time detection apparatus 1(1') in the above embodiments. After program category is pre-judged by the program category retrieval apparatus 23, the keyword retrieval unit 12 retrieves, in accordance with the program category, endpoint keyword corresponding to this program category. For example, the expression indicating the start of the match may be "kick-off" in the football match, and may be "serve" in the billiards games. By importing a function of program category judgment into the program endpoint time detection apparatus 1(1'), it is possible to narrow the retrieval range and improve the retrieval efficiency and retrieval precision.

In addition, in the program information retrieval system 2, the keyword retrieval unit 12 in the above embodiments also can display, on the display apparatus 21, a keyword list corresponding to the program selected by the user from above program list, such as highlight event, critical name, team name or the like, and retrieve a corresponding keyword in accordance with user's selection. With a method such as keyword match or the like as described above, corresponding keywords are retrieved and the time information thereof are displayed on the display apparatus 21. Likewise, such keywords also can be stored in a specific region in the memory (not shown).

The highlight event retrieval apparatus 24 is mainly used to perform retrieval on the audio of program which indicates the continuance of highlight segments, such as cheering. Retrieval for cheering can employ a plurality of methods such as sliding window analysis framework and hidden Markov framework or the like, and a flexible selection may be made according to requirements. The former [1] realizes the extraction of cheering by adding a window to audio steams and judging the audio category of the segment in the window by a classifier.

The speaker retrieval apparatus 25 retrieves a program portion in which a specific speaker is speaking, and differently displaying, on the display apparatus 21, the time information about the speaking portion by different speakers. Here, as an example, it is possible to retrieve commentary portion of sports games by different narrators. For example, narrator retrieval can be achieved by speaker recognition, and the present methods include GMM-UBM method, SVM method, HMM method and the like, and a flexible selection may be made according to requirements.

As described above, although in the program information retrieval system 2 of the present embodiment, the portions of program endpoint time detection apparatus 1(1'), the program category retrieval apparatus 23, the highlight event retrieval apparatus 24, the speaker retrieval apparatus 25 and the keyword retrieval unit 12 are provided to realize a corresponding function, it is also possible to provide above functions separately or in combination with various forms, according to the user's requirements, and the modified embodiment of the above embodiment, which is obtained by any combination thereof, also falls into the scope claimed by present invention.

Figure 6:
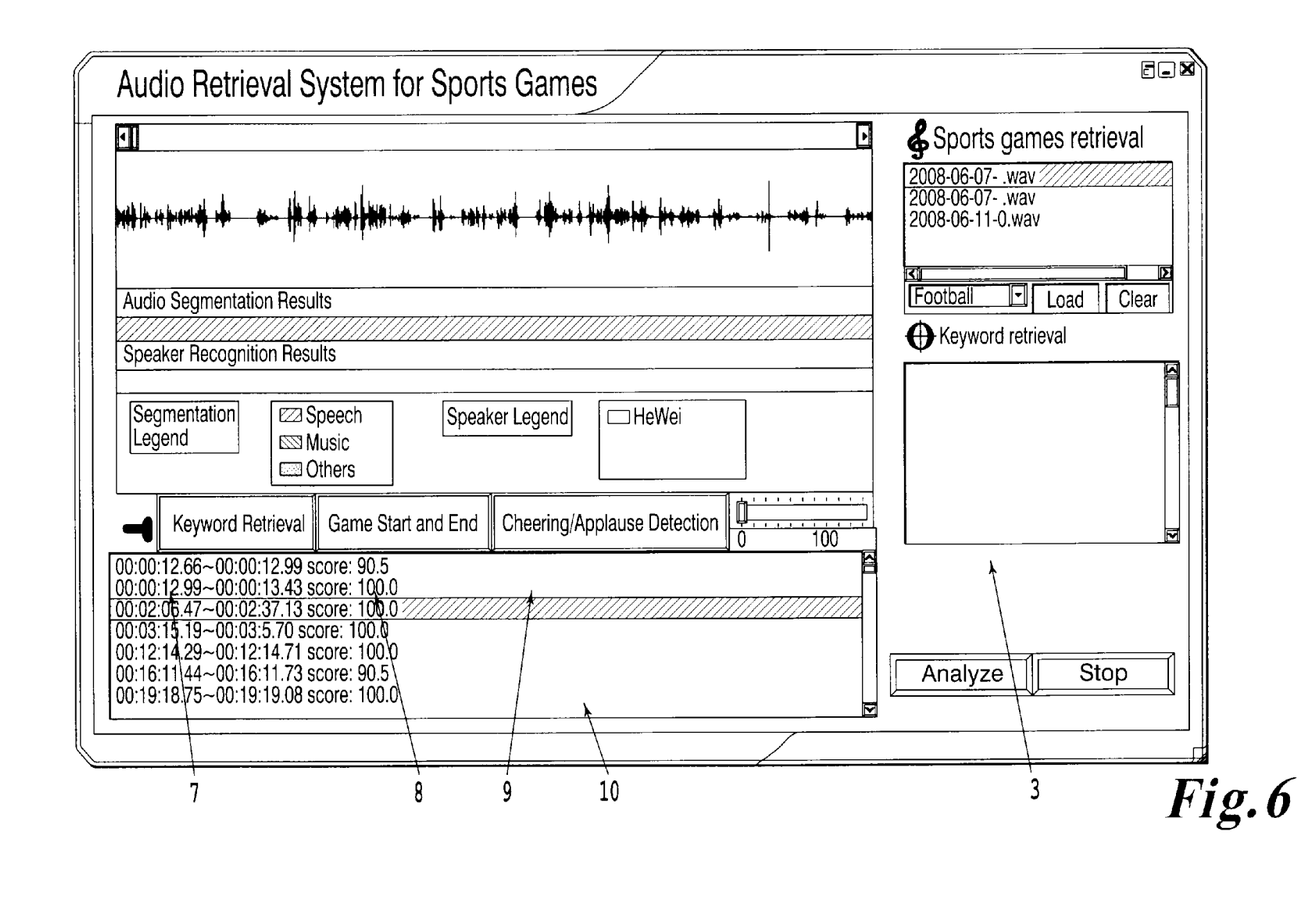
FIG. 6 is schematic diagram illustrating an example of user interface of the program information retrieval system 2.

FIG. 6 is schematic diagram illustrating an example of user interface of the program information retrieval system 2.

As an example of the program information retrieval system 2, on the display apparatus 21, as shown in FIG. 6, for example the following user interface is displayed, in which the selection for the data on different sports games can be realized by clicking the pull-down menu at region 1. In this embodiment, for example, "football" is selected, and the filtered sports games list is obtained at region 2, such as "2008-06-07-European Cup-Czech Republic-Switzerland.wav", "2008-06-07-European Cup-Portugal-Turkey.wav", "2008-06-11-European Cup-Switzerland-Turkey.wav". Double-clicking a certain sports game in the region 2 (the first one is selected herein), the audio document regarding this sports game is displayed at region 4, keyword list to be detected corresponding to category of football is listed at region 3, different colors are employed at region 5 to show different audio categories, and different colors are respectively used at position 6 to show different narrators. Regions 7, 8 and 9 can be respectively clicked to display the retrieved keywords in multi-screen, start and end time of the play, cheering. The retrieval result is displayed at region 10.

Through the above program information retrieval system 2, the user can comprehensively obtain a variety of information related to a game of his/her concern. Of course, these functions are not necessarily included in the program information retrieval system 2 of present invention, and can be properly provided in combination according to the user's customization.

Hereinbefore, the content of present invention have been explained with reference to specific embodiments. However, the embodiments are only for illustration, and not intended to limit the scope claimed by present invention. In addition, to facilitate explanation, program endpoint time detection apparatus and program information retrieval system of present invention are described in a form of functional block diagram. However, program endpoint time detection apparatus and program information retrieval system of this type also can be implemented by hardware, software or combination thereof, alternatively or implemented by well-known computers, which is obvious to those skilled in the art.

What is claimed is:

1. A program endpoint time detection apparatus for detecting an endpoint time of a program by performing processing on audio signals of said program, comprising:
   circuitry configured to:
   classify said audio signals into a speech signal portion and a non-speech signal portion; and
   as to the non-speech signal portion, the circuitry is configured to:
   retrieve, from the non-speech signal portion, a feature audio portion indicating a start or end of the program, and a fixed audio portion indicating the program that is about to start, and
   as to the speech signal portion, the circuitry is configured to:
   retrieve, as a candidate endpoint keyword, an endpoint keyword indicating start or end of the program from said speech signal portion, the endpoint keyword being retrieved only from the speech signal portion which is adjacent to the start and end of the program within a time range determined by the feature audio portion;
   perform a first content analysis on a context of the retrieved candidate endpoint keyword to determine whether the retrieved candidate endpoint keyword is a valid endpoint keyword; and
   perform a second content analysis on the speech signal portion to determine an expression similar to the endpoint keyword indicating start or end of the program,
   wherein the circuitry is configured to perform statistics analysis based on the retrieved endpoint keyword, determination results of the first and second content analysis, the feature audio portion, and the fixed audio portion, and determine the endpoint time of the program.

2. The program endpoint time detection apparatus according to claim 1, wherein the circuitry divides the audio signals into a plurality of scene portions containing a program-on-the-spot audio portion, wherein the circuitry only classifies the program-on-the-spot audio portion of the audio signals into the speech signal portion and the non-speech signal portion.

3. The program endpoint time detection apparatus according to claim 2, wherein the circuitry only retrieves the feature audio portion from the non-speech signal portion which is adjacent to a start and end of the program-on-the-spot audio portion.

4. The program endpoint time detection apparatus according to claim 1, wherein the circuitry only retrieves the endpoint keyword from the non-speech signal portion which is adjacent to the start and end of the program within a time range determined by the fixed audio portion.

5. The program endpoint time detection apparatus according to claim 1, wherein the circuitry divides the audio signals into a plurality of scene portions containing a program-on-the-spot audio portion, wherein the circuitry only classifies the program-on-the-spot audio portion of the audio signals into the speech signal portion and the non-speech signal portion, and
   the circuitry further retrieves said fixed audio portion from said plurality of scene portions.

6. The program endpoint time detection apparatus according to claim 2, wherein the circuitry detects, from the audio signals, a silence portion indicating a switching between different program portions, so as to divide the audio signals into a plurality of portions, wherein the circuitry performs an analysis on the plurality of portions, so as to be divided into said plurality of scene portions.

7. The program endpoint time detection apparatus according to claim 1, wherein the circuitry divides the audio signals into a plurality of scene portions including a program-on-the-spot audio portion, wherein the circuitry only classifies said on-the-spot audio portion of the audio signals into speech signal portion and non-speech signal portion.

8. The program endpoint time detection apparatus according to claim 1, wherein the circuitry retrieves a keyword indicating a type of the program from said speech signal portion, so as to determine the type of the program, wherein the circuitry retrieves a corresponding endpoint keyword in accordance with the type of the program.

9. The program endpoint time detection apparatus according to claim 1, wherein the circuitry performs a speech recognition on said speech signal portion and constructs a corresponding retrieval document; and further comprising a storage for storing a keyword indicating a program feature, said keyword including at least the endpoint keyword indicating start or end of the program, wherein the circuitry retrieves, as the candidate endpoint keyword, the endpoint keyword indicating start or end of the program from said retrieval document, and the circuitry performs the content analysis on the context of the candidate endpoint keyword in the retrieval document, so as to determine the valid endpoint keyword.

10. A program endpoint time detection method for detecting an endpoint time of a program by performing processing on audio signals of said program, comprising:

classifying said audio signals into a speech signal portion and a non-speech signal portion; and as to the non-speech signal portion,
retrieving, from the non-speech signal portion, a feature audio portion indicating a start or end of the program, and a fixed audio portion indicating the program that is about to start, and as to the speech signal portion,
retrieving, as a candidate endpoint keyword, an endpoint keyword indicating start or end of the program from said speech signal portion, the endpoint keyword being retrieved only from the speech signal portion which is adjacent to the start and end of the program within a time range determined by the feature audio portion;

performing a first content analysis on a context of the retrieved candidate endpoint keyword to determine whether the retrieved candidate endpoint keyword is a valid endpoint keyword; and performing a second content analysis on the speech signal portion to determine an expression similar to the endpoint keyword indicating start or end of the program, and performing, using circuitry, statistics analysis based on the retrieval result of said keyword retrieval step, determination results of said first and second content analysis step, the feature audio portion, and the fixed audio portion, and determining the endpoint time of the program.

11. The program endpoint time detection method according to claim 10, further comprising an audio scene analysis step of dividing the audio signals into a plurality of scene portions containing a program-on-the-spot audio portion, wherein in the audio classification step, only the program-on-the-spot audio portion of the audio signals is classified into the speech signal portion and the non-speech signal portion.

12. The program endpoint time detection method according to claim 11, wherein in the feature audio retrieval step, retrieval is only performed on the non-speech signal portion which is adjacent to a start and end of the program-on-the-spot audio portion.

13. The program endpoint time detection method according to claim 10, wherein in the keyword retrieval step, retrieval is only performed on the non-speech signal portion which is adjacent the start and end of the program within a time range determined by the fixed audio portion.

14. The program endpoint time detection method according to claim 10, further comprising an audio scene analysis step of dividing the audio signals into a plurality of scene portions containing a program-on-the-spot audio portion, wherein in the audio classification step, only the program-on-the-spot audio portion of the audio signals is classified into the speech signal portion and the non-speech signal portion, wherein in the fixed audio retrieval step, said fixed audio portion is further retrieved from said plurality of scene portions divided in the audio scene analysis step.

15. The program endpoint time detection method according to claim 11, wherein the audio scene analysis step further comprises a switching gap detection step of detecting, from the audio signals, a silence portion indicating a switching between different program portions, so as to divide the audio signals into a plurality of portions, wherein in the audio scene analysis step, an analysis is performed on the plurality of portions divided in the switching gap detection step, so as to be divided into said plurality of scene portions.

16. The program endpoint time detection method according to claim 10, further comprising an audio scene analysis step of dividing the audio signals into a plurality of scene portions including a program-on-the-spot audio portion, wherein in the audio classification step, only said on-the-spot audio portion of the audio signals is classified into speech signal portion and non-speech signal portion.

17. The program endpoint time detection method according to claim 10, further comprising a program classification step of retrieving a keyword indicating a type of the program from said speech signal portion, so as to determine the type of the program, wherein in the keyword retrieval step, a corresponding endpoint keyword is retrieved in accordance with the type of the program.

18. The program endpoint time detection method according to claim 10, further comprising a speech recognition step of performing speech recognition on said speech signal portion and constructing a corresponding retrieval document, wherein in the keyword retrieval step, the endpoint keyword indicating start or end of the program is extracted from a storage unit, and the endpoint keyword indicating start or end of the program is retrieved as the candidate endpoint keyword from said retrieval document, and in the content analysis step, a content analysis is performed on the context of the candidate endpoint keyword in the retrieval document, so as to determine the valid endpoint keyword.

19. A program information retrieval system for obtaining program information desired by a user by performing processing on audio signals of a program, comprising:

a display for displaying a user interface of said system;

a program import apparatus for importing a plurality of programs into said program information retrieval system and displaying a program list on said display apparatus; and a program endpoint time detection apparatus for analyzing a program selected by the user from said program list, so as to obtain the endpoint time of said program and display the endpoint time of said program on said display apparatus, wherein said program endpoint time detection apparatus comprises:

circuitry configured to classify said audio signals into a speech signal portion and a non-speech signal portion; and as to the non-speech signal portion, the circuitry is configured to:

retrieve, from the non-speech signal portion, a feature audio portion indicating a start or end of the program, and a fixed audio portion indicating the program that is about to start, and as to the speech signal portion, the circuitry is configured to:

retrieve, as a candidate endpoint keyword, an endpoint keyword indicating start or end of the program from said speech signal portion, the endpoint keyword being retrieved only from the speech signal portion which is adjacent to the start and end of the program within a time range determined by the feature audio portion;

perform a first content analysis on a context of the retrieved candidate endpoint keyword to determine whether the retrieved candidate endpoint keyword is a valid endpoint keyword; and perform a second content analysis on the speech signal portion to determine an expression similar to the endpoint keyword indicating start or end of the program, wherein the circuitry is configured to perform statistics analysis based on the retrieved endpoint keyword, determination results of the first and second content analysis, the feature audio portion, and the fixed audio portion, and determine the endpoint time of the program.

20. The program information retrieval system according to claim 19, wherein the circuitry classifies said plurality of programs imported by the program import apparatus in accordance with a category to which the program belongs, and the circuitry controls the display to display, according to a category instructed by the user, a program list of this category.

21. The program information retrieval system according to claim 19, wherein the circuitry retrieves a cheering clip occurred in the program, and the circuitry controls the display to display time information thereof.

22. The program information retrieval system according to claim 19, wherein the circuitry retrieves a portion in the program in which a specific speaker is speaking, and the circuitry controls the display to differently display time information about the portion spoken by different speakers.

23. The program information retrieval system according to claim 19, wherein the circuitry controls the display to display a keyword list corresponding to the program selected by the user from the program list and retrieves corresponding keyword according to a selection of the user, and controls the display to display time information about the keyword.

24. The program endpoint time detection apparatus according to claim 1, wherein the feature audio portion refers to a sound specific to the program.

25. The program endpoint time detection apparatus according to claim 1, wherein the sound appears only in the program.

* * * * *